United States Patent [19]
Machida

[11] Patent Number: 5,746,497
[45] Date of Patent: May 5, 1998

[54] AUTOMOTIVE SIGNAL LAMPS

[75] Inventor: Tsutomu Machida, Shizuoka, Japan

[73] Assignee: Koito Manufacturing Co., Ltd., Tokyo, Japan

[21] Appl. No.: 655,832

[22] Filed: May 31, 1996

[30] Foreign Application Priority Data

Jun. 9, 1995 [JP] Japan .................................. 7-167112

[51] Int. Cl.$^6$ .................................................. B60Q 1/00
[52] U.S. Cl. .................. 362/80; 362/294; 362/373; 362/800; 340/479
[58] Field of Search ................... 362/80, 80.1, 311, 362/340, 479, 294, 249, 800, 396; 340/479

[56] References Cited

U.S. PATENT DOCUMENTS 4,972,303  11/1990  Machida et al. .......................... 362/80
5,272,602  12/1993  Sasajima et al. ....................... 362/80.1

FOREIGN PATENT DOCUMENTS

6-88003  12/1994  Japan .

Primary Examiner—James C. Yeung
Attorney, Agent, or Firm—Morgan, Lewis & Bockius LLP

[57] ABSTRACT

An automotive signal lamp including a plurality of light emitting diodes arranged along an edge of a base plate disposed within a lamp chamber, a plus line connector formed of a web-like conductive material and extending in an alignment direction of the light emitting diodes, and a minus line connector formed of a web-like conductive material and extending substantially in parallel with the plus line connector, wherein a predetermined number of the light emitting diodes constitute one light emitting diode group, one lead connector of each of the light emitting diodes is integrally formed with one lead connector of the adjacent light emitting diode through a joint piece, an outer lead connector of one utmost light emitting diode of the light emitting diode groups connects to the plus line connector through the short-circuit piece, and an outer lead connector of the other utmost light emitting diode of the light emitting diode group connects to a minus line connector through a resistor which is provided to bridge over the plus line connector.

22 Claims, 8 Drawing Sheets

AUTOMOTIVE SIGNAL LAMPS

BACKGROUND OF THE INVENTION

1. Field of the Invention

The present invention relates to improved signal lamps for automobiles. More particularly, the invention relates to an automotive signal lamp in which many light emitting diodes each having a lead connector are disposed within a lamp chamber, and the light emitting diodes are arranged in lateral direction of the signal lamp, characterized in that the signal lamp is designed to simplify the circuit structure for supplying power to each of the light emitting diodes, so that the number of parts or components can be reduced, the workability during assembly is improved, and as a result thereof the manufacturing cost can be reduced.

2. Related Art

There has been known an automotive signal lamp having a laterally elongated lamp chamber in which many light emitting diodes (hereinafter merely referred to LEDs when applicable) are mounted on a printed circuit board.

As an example, the present inventor proposed an automotive signal lamp as disclosed in Japanese Utility Model Publication No. Hei. 6-88003. According to the proposed signal lamp, LEDs each having a lead connector are mounted on a printed circuit board under a condition where the lead connectors are arranged along the mounting surface of the printed circuit board and the printed circuit board is disposed within a lamp chamber substantially in parallel with the signal lamp, so that the thickness of the signal lamp in the vertical direction thereof can be reduced.

Therefore, the automotive signal lamp thus proposed can reduce the thickness in the vertical direction thereof because the printed circuit board is disposed within the lamp chamber in parallel with the signal lamp.

However, with the proposed automotive signal lamp, since each of the LEDs, which are separately provided, must be soldered to a predetermined correct position on the printed circuit board, the workability during assembly of the automotive signal lamp is poor. Further, the printed circuit board is required as a component part to electrically connect to each of the LEDs. For this reason, it is difficult to reduce the number of required component parts.

Furthermore, due to the structure of the proposed automotive signal lamp discussed above, although LEDs are generally supplied in a condition where lead connectors are continuously arranged by a lead frame, these lead connectors must be taken into pieces to solder each connector to the printed circuit board during the assembly. Therefore, required assembly steps increases undesirably.

SUMMARY OF THE INVENTION

The present invention was made in view of the foregoing difficulties or problems accompanying the conventional automotive signal lamp. Accordingly, an object of the present invention is to provide an automotive signal lamp capable of reducing the number of required component parts, decreasing required assembly steps, and improving workability during assembly.

The above objects can be attained by a provision of an automotive signal lamp in which, according to the present invention, a predetermined number of LEDs constitute one LED group, one lead connector of each of the LEDs is integrally formed with one lead connector of the adjacent LED through a joint piece, an outer lead connector of one utmost LED of the LED groups connects to a plus line connector through the short-circuit piece, and an outer lead connector of the other utmost LED of the LED group connects to a minus line connector through a resistor which is provided to bridge over the plus line connector.

According to the automotive signal lamp of the present invention, a plurality of LEDs, which are supplied in a condition where lead connectors are continuously arranged by a lead frame, are not required to be taken into pieces, instead, a power supply circuit for the LEDs can be constituted merely by cutting out predetermined portions of the lead frame and connecting to predetermined portions through resistors or the like. Therefore, no printed circuit board is required, the number of required component parts can be reduced, the LEDs are not necessary to be soldered to printed circuit board, so that the required assembly steps can be decreased and the workability during assembly can be improved. As a result, the manufacturing cost can be reduced.

DESCRIPTION OF THE PREFERRED EMBODIMENTS

Preferred embodiments of the present invention will now be described with reference to accompanying drawings. In the embodiments, the present invention is applied to a subsidiary stop lamp so called as a high-mount stop lamp.

Figure 1:
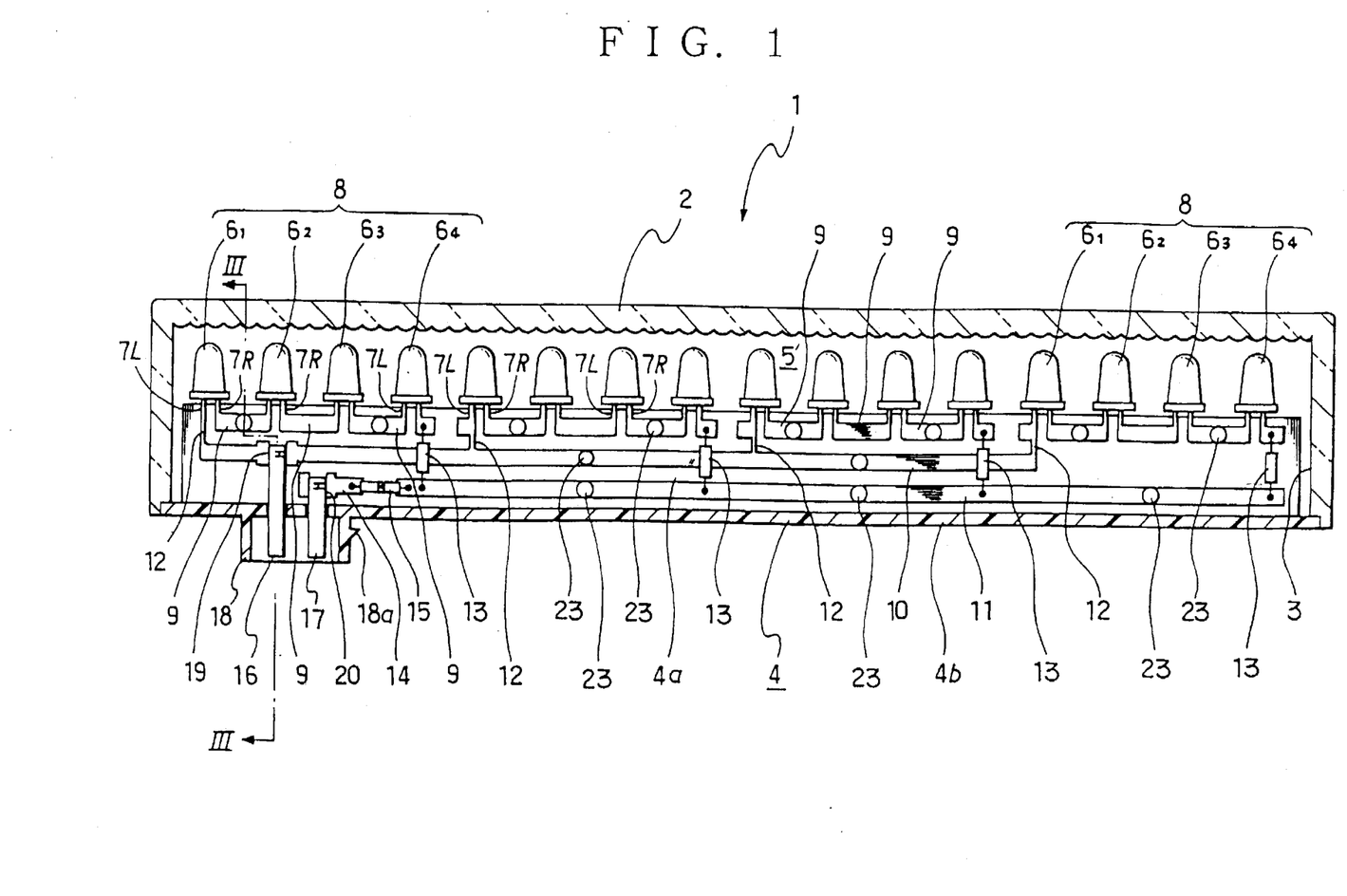
FIG. 1 is a horizontal sectional view showing an automotive signal lamp according to one embodiment of the present invention.
Figure 2:
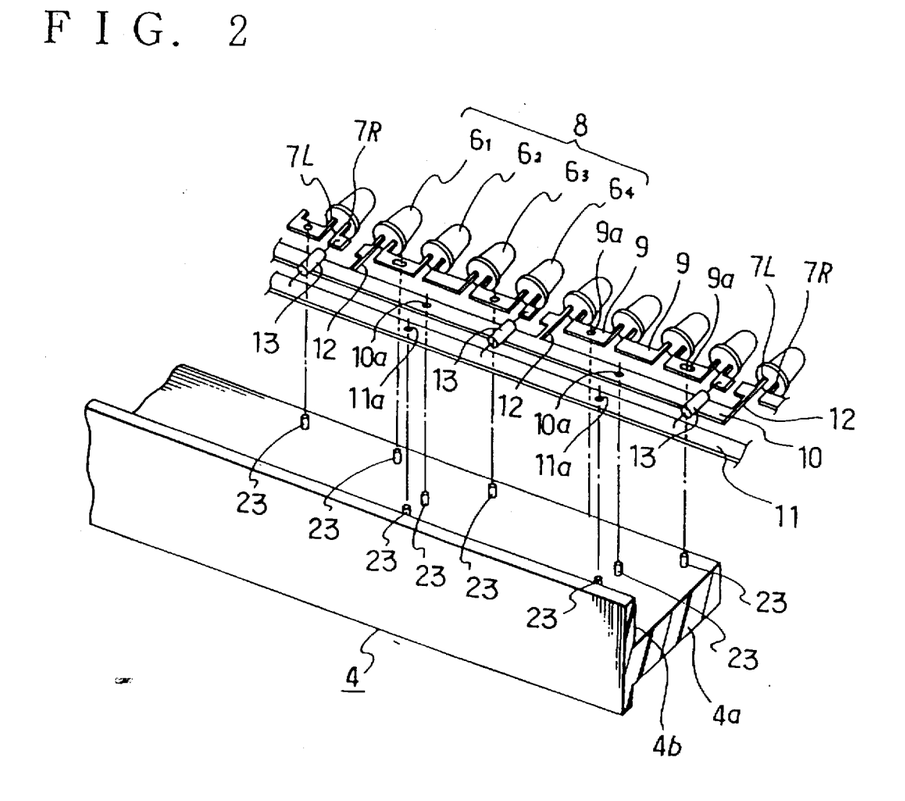
FIG. 2 is an exposed perspective view showing an essential part of the automotive signal lamp shown in FIG. 1.
Figure 3:
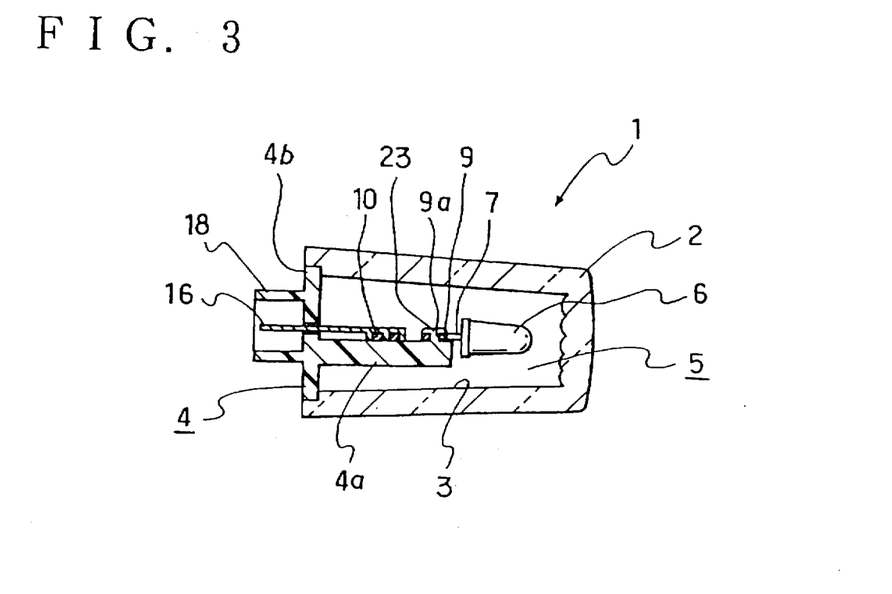
FIG. 3 is an enlarged sectional view cut along a line III—III of FIG. 1.
Figure 4:
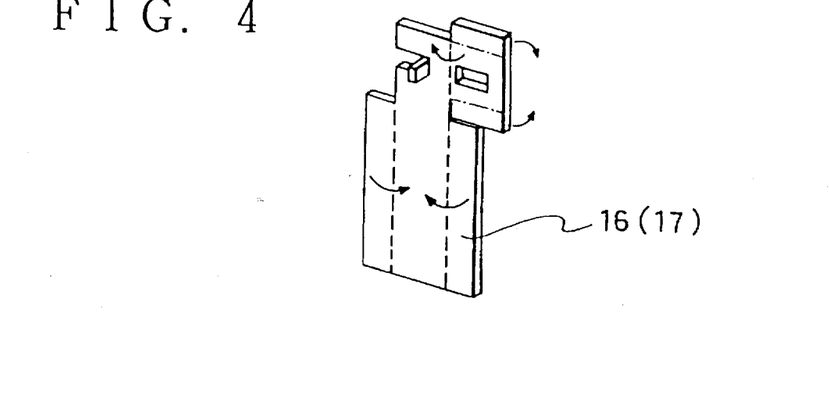
FIG. 4 is an enlarged perspective view showing a plate conductive member before bending to be a power supply terminal according to the invention.
Figure 5:
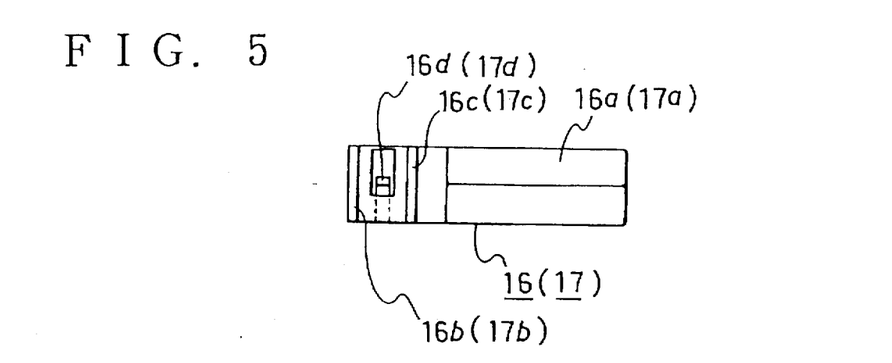
FIG. 5 is an enlarged bottom view showing the power supply terminal shown in FIG. 4.
Figure 6:
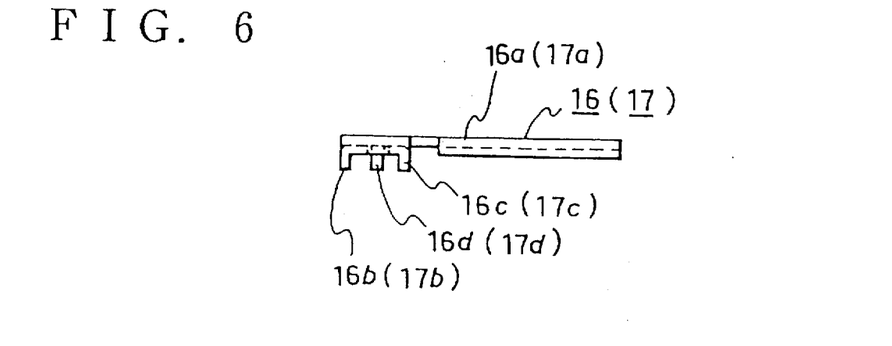
FIG. 6 is an enlarged side view showing the power supply terminal shown in FIG. 4.
Figure 7:
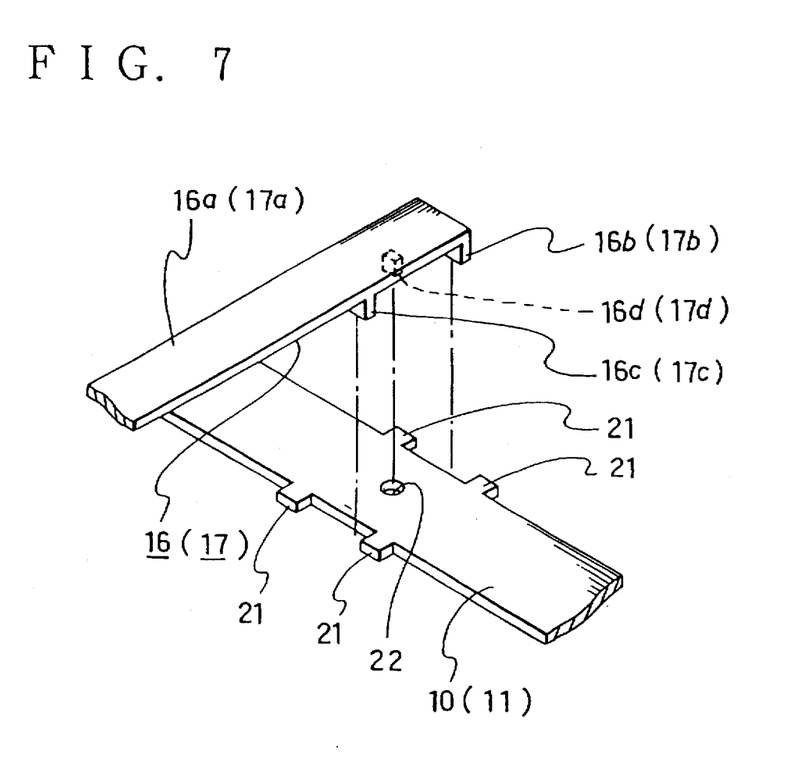
FIG. 7 is an enlarged exposed perspective view of mounting portion of the power supply terminal.
Figure 8:
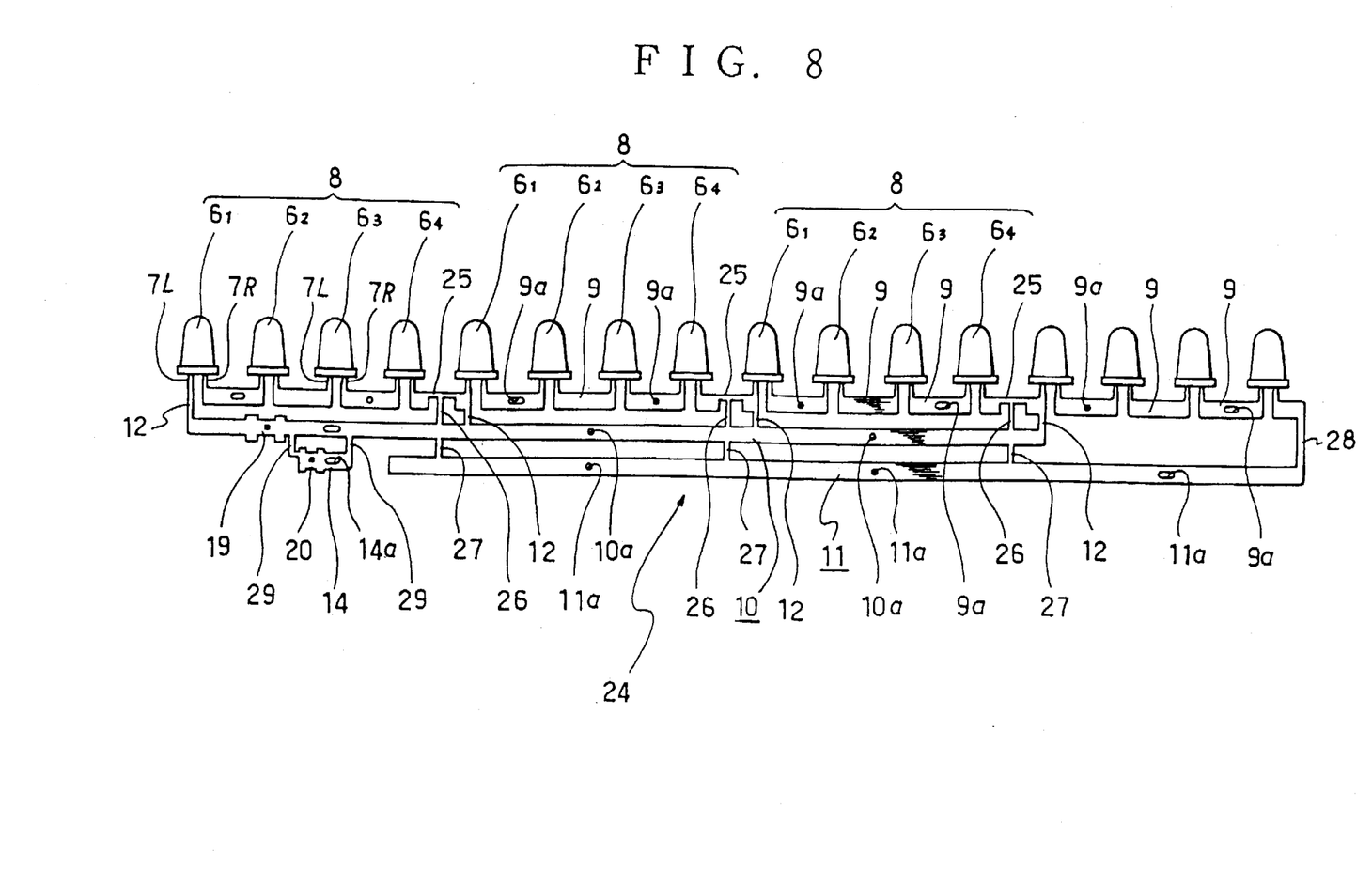
FIG. 8 is a plan view of a lead frame on which a plurality of LEDs are connected.
Figure 9:
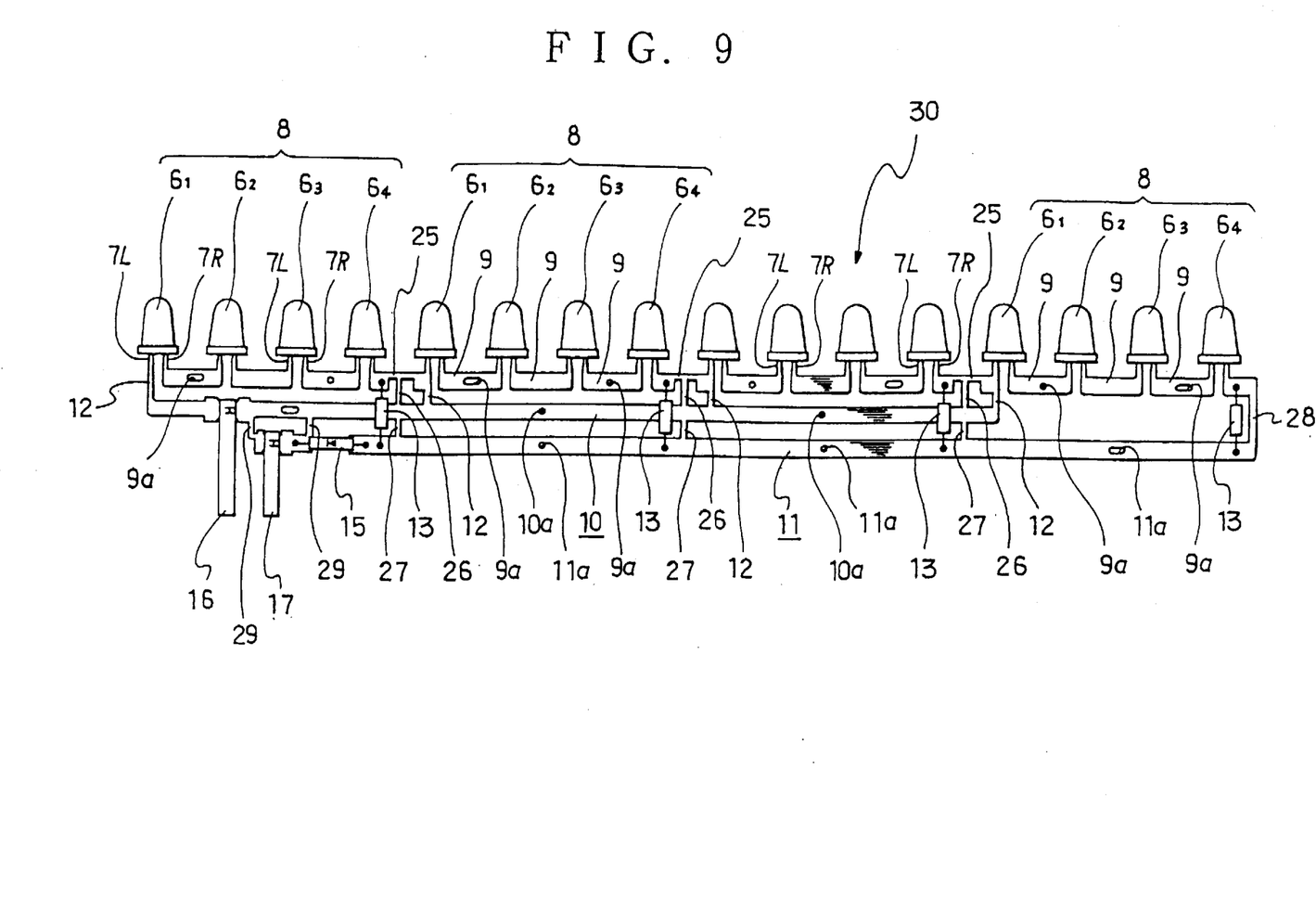
FIG. 9 is a plan view showing the power supply circuit.

FIGS. 1 through 9 show one embodiment of an automotive signal lamp according to the present invention. More specifically, FIG. 1 is a horizontal sectional view showing an automotive signal lamp according to one embodiment of the present invention, FIG. 2 is an exposed perspective view showing an essential part of the automotive signal lamp shown in FIG. 1, FIG. 3 is an enlarged sectional view cut along a line III—III of FIG. 1, FIG. 4 is an enlarged perspective view showing a plate conductive member before bending to be a power supply terminal according to the invention, FIG. 5 is an enlarged bottom view showing the power supply terminal shown in FIG. 4, FIG. 6 is an enlarged side view showing the power supply terminal shown in FIG. 4, FIG. 7 is an enlarged exposed perspective view of mounting portion of the power supply terminal, FIG. 8 is a plan view of a lead frame on which a plurality of LEDs are connected, and FIG. 9 is a plan view showing the power supply circuit.

As shown in FIG. 1, a lens body 2 is formed of a colored transparent synthetic resin and elongated in the lateral direction, and the lens body 2 is thin in comparison with the lateral length. Further, the lens body 2 is substantially lateral U-shaped in cross section, has a cupped part 3 opening rearwardly. An opening end of the cupped part 3 is closed by a lamp body 4 so that a laterally elongated lamp chamber 5 is defined by the lens body 2 and the lamp body 4.

In the following description, the leftward direction and rightward direction in FIG. 1 are now defined as left side and right side, respectively. Similarly, the upward direction and downward direction in FIG. 1 are now defined as front direction and rear direction, respectively.

As shown in FIG. 3, the lamp body 4 having a T-shape in cross section is provided with a horizontal wall, i.e., a base plate 4a which is disposed within the lamp chamber 5 and a vertical wall 4b which closes the opening end of the cupped part 3 of the lens body 2. Though the base plate 4a is integrally formed with the lamp body 4 as an example according to the present embodiment, the invention is not limited thereto or thereby. For example, a separately provided base plate may be attached to the lamp body.

A plurality of LEDs 6 are arranged on the front end part of the base plate 4a of the lamp body 4 along a front edge thereof while protruding from the front edge of the base plate 4a. A plurality of lead connectors 7 for the LEDs 6 are mounted on an upper side surface of the base plate 4a. The way to mount the lead connectors 7 on the base plate 4a will be described later in detail.

Four of the LEDs 6 constitute one LED group 8. More specifically, as best shown in FIG. 1, one lead connector 7 for one LED 6 is integrally formed through a joint piece 9 with one lead connector 7 for an adjacent LED 6 in the same LED group 8, so that the four LEDs 6 in the same group 8 form one unit through the three joint pieces 9 and electrically connect in series to one another, to thereby form one LED group 8. A plurality of LED groups 8 are mounted on the base plate 4a to perform as a light source for the automotive signal lamp 1.

On the upper surface of the base plate 4a of the lamp body 4, a web-like plus line connector 10 formed of a conductive material is mounted at a position between the vertical wall 4b and the joint pieces 9 whereas a web-like minus line connector 11 formed of a conductive material is mounted in parallel with the plus line connector 10 at a position between the vertical wall 4b and the plus line connector 10. The way to mounting the plus line connector 10 and the minus line connector 11 on the base plate 4a will be described later in detail.

The plus line connector 10 has a length extending from the leftmost LED $6_1$ of the leftmost LED group 8 to the leftmost LED $6_1$ of the rightmost LED group 8, whereas the minus line connector 11 has a length extending from the right LED $6_4$ of the leftmost LED group 8 to the rightmost LED $6_4$ of the rightmost LED group 8.

As shown in the figures, a left lead connector $7_L$ for the leftmost LED $6_1$ of each of the LED groups 8 connects to the plus line connector 10 through a short-circuit piece 12, whereas a right lead connector $7_R$ for the rightmost LED $6_4$ of each of the LED groups 8 connects to the minus line connector 11 through a resistor 13 which is provided to bridge over the plus line connector 10.

A minus side power supply terminal connecting piece 14 is disposed at a position on a line extending from the left end of the minus line connector 11 and rightward from the left end of the plus line connector 10. The right end of the minus side power supply terminal connecting piece 14 connects to the left end of the minus line connector 11 through a diode 15 which allows electric current to flow only from the minus line connector 11 to the minus side power supply terminal connecting piece 14. The purpose of the diode 15 is to avoid reverse-current. In place of the diode 15, a diode may be provided at a harness side for supplying electric power to the automotive signal lamp 1. In this case, the minus side power supply terminal connecting piece 14 can be formed integrally with the minus line connector 11.

A plus side power supply terminal 16 extending rearward connects to the plus line connector 10 in the vicinity of the left end thereof, whereas a minus side power supply terminal 17 extending rearward connects to the left end part of the minus side power supply terminal connecting piece 14. The minus side power supply terminal 17 and the plus side power supply terminal 16 extend in parallel with each other and penetrate the vertical wall 4b of the lamp body 4 and project therefrom.

The parts of the minus side power supply terminal 17 and the plus side power supply terminal 16 which project from the vertical wall 4b of the lamp body 4 are surrounded by an enclosure wall 18 which is integrally formed with the vertical wall 4b and rectangular in cross section. The enclosure wall 18 and each of the minus side power supply terminal 17 and the plus side power supply terminal 16 serve as an outer guide and terminals, respectively, of a connector. The enclosure wall 18 is provided on an outer surface of a right wall thereof with an engagement member 18a for engaging with a connector of a vehicle body (not shown).

As best shown in FIG. 1, the minus side power supply terminal 17 and the plus side power supply terminal 16 have a different length from each other but the configuration of which are substantially the same as each other. That is, specifically as shown in FIGS. 4 through 7, both the plus side power supply terminal 16 and the minus side power supply terminal 17 are respectively provided with a web-like, long rectangular body part 16a (17a), a front engagement piece 16b (17b) protruding downward from a front edge of the body part 16a (17a), a rear engagement piece 16c (17c) facing the front edge of the body parts 16a (17a), protruding downward from the same plane as the front engagement piece 16b (17b), a projection 16d (17d) disposed between the front engagement piece 16b (17b) and the rear engagement piece 16c (17c), which projection projects from the same plane. As shown in FIGS. 4, 5 and 6, a distance between the front engagement piece 16b and the rear engagement piece 16c is designed to be slightly larger than the width of the plus line connector 10. Similarly, a distance between the front engagement piece 17b and the rear engagement piece 17c is designed to be slightly larger than the width of the minus side power supply terminal connecting piece 14.

The plus side power supply terminal 16 and the minus side power supply terminal 17 are formed by stamping out a plate member formed of a conductive material to have a predetermined contour and bending the same by means of press processing as shown in FIG. 4. In FIG. 4, dashed lines represent a trough of the bending while one-dotted lines represent a ridge thereof.

A plus terminal connecting part 19 of the plus line connector 10 connecting to the plus side power supply terminal 16 and a minus terminal connecting part 20 of the minus side power supply terminal connecting piece 14 connecting to the minus side power supply terminal 17 are formed in such a way as described hereinbelow. In this regard, since both the terminal connecting parts 19 and 20 have the same configuration as each other, the description below merely refers to the plus terminal connecting part 19 of the plus line connector 10 whereas that for the minus terminal connecting part 20 of the minus side power supply terminal connecting piece 14 will be omitted here.

As shown in FIG. 7, the plus terminal connecting part 19 is formed with two pairs of short tongue pieces 21 distanced in the lateral direction and a positioning hole 22 having a small diameter. The tongue pieces 21 project frontward and rearward from the plus line connector 10 in the vicinity of the left end thereof and the positioning hole 22 located at substantially center of the tongue pieces 21. The distance between the tongue pieces 21, 21 in the lateral direction is designed to be slightly larger than the width of the plus side power supply terminal 16.

As shown in FIG. 7, the projections 16d and 17d of the power supply terminals 16 and 17 fit in the positioning holes 22, 22 of the terminal connecting parts 19 and 20, respectively, while sandwiching the plus line connector 10 between the front engagement pieces 16b, 17b and the rear engagement pieces 16c, 17c. Then, while fitting the front engagement pieces 16b, 17b and the rear engagement pieces 16c, 17c between the respective couples of the tongue pieces 21, 21, the plus side power supply terminal 16 and the minus side power supply terminal 17 are secured respectively to the plus line connector 10 and the minus side power supply terminal connecting piece 14 by spot welding or the like. In these operation, since the plus line connector 10 is sandwiched by the front engagement pieces 16b, 17b and the rear engagement pieces 16c, 17c and, on the other hand, the front engagement pieces 16b, 17b and the rear engagement pieces 16c, 17c are sandwiched by the tongue pieces 21, 21, the positional deviation of the plus line connector 10 with respect to the power supply terminals 16, 17 can be effectively avoided.

As best shown in FIG. 2, caulking bosses 23, 23 . . . projecting from appropriate positions of the base plate 4a fit in the caulking holes 9a of the joint pieces 9, holes 10a of the plus line connector 10, holes 11a of the minus line connector 11 and hole 14a of the minus side power supply terminal connecting piece 14 and, then, the caulking bosses 23, 23 . . . projecting from these members are caulked by heat or cool caulking process.

With the fitting and caulking processes, the joint pieces 9, the plus line connector 10, the minus line connector 11 and the minus side power supply terminal connecting piece 14 are secured onto the base plate 4a, and therefore the LEDs 6 are mounted on the base plate 4a so that the LEDs 6 project from the front edge of the base plate 4a. In the caulking small holes 9a, 10a and 11a of the joint pieces 9, the plus line connector 10 and the minus line connector 11, respectively, merely one hole is circle locating at an approximately center in the lateral direction of the automotive signal lamp 1 whereas the other holes are slightly elongated in the lateral direction to thereby absorb the dimensional tolerances, which may be generated during the manufacture, of the caulking small holes 9a, 10a, 11a and 14a with respect to the respective caulking bosses 23.

The lead connectors 7 of the LEDs 6, the joint pieces 9, the plus line connector 10, the short-circuit piece 12, the minus line connector 11 and the minus side power supply terminal connecting piece 14 are formed by cutting out unnecessary portions of a lead frame 24 which integrally formed with the lead connectors 7 of the plurality of LEDs 6, as specifically described hereinbelow.

As shown in FIG. 8, the lead frame 24 is integrally formed with the lead connectors 7 for the LEDs 6, the joint pieces 9, the plus line connector 10, the minus line connector 11, the minus side power supply terminal connecting piece 14 and a plurality of the other joint pieces connecting these members to one another. The lead frame 24 is produced together with the LEDs 6.

That is, the lead frame 24 is constituted as follows: the left lead connector $7_L$ of the leftmost LED $6_1$ of each of the LED group 8 except for the leftmost LED group 8 connects to the right lead connector $7_R$ of the rightmost LED $6_4$ of the adjacent LED group 8 through a connecting piece 25; the connecting pieces 25 connect to the plus line connector 10 through connecting pieces 26; the plus line connector 10 connects to the minus line connector 11 through connecting pieces 27; the right end part of the minus line connector 11 connects to the right lead connector $7_R$ of the rightmost LED $6_4$ of the rightmost LED group 8 through a connecting piece 28; and the plus line connector 10 connects to the minus side power supply terminal connecting piece 14 through a couple of connecting pieces 29.

Thus, the lead frame 24 and the LEDs 6 integrally attaching to and aligning in the lateral direction of the lead frame 24 are supplied under the condition shown in FIG. 8.

With the lead frame 24 thus supplied, as shown in FIG. 9, the resistors 13, diode 15 and the power supply terminals 16, 17 are connected to appropriate positions of the lead frame 24 by ultrasonic fuse-bonding or the like. Afterward, the connecting pieces 25, 26, 27, 28 and 29 are cut out from the lead frame 24 so that the remaining parts of the lead frame 24 constitute the lead connectors 7 of the LEDs 6, the joint pieces 9, the plus line connector 10, the minus line connector 11, the short-circuit piece 12 and the minus side power supply terminal connecting piece 14, to thereby form a power supply circuit 30.

The power supply circuit 30 thus provided is mounted on the base plate 4a of the lamp body 4 as described above, and the LEDs 6 are disposed at predetermined positions.

Other than the above, the power supply circuit 30 may also be formed by cutting out the unnecessary parts of the lead frame 24, that is, the connecting pieces 25, 26, 27, 28 and 29, soldering the resistors 13, the diode 15 and the power supply terminals 16, 17, and then mounting the circuit on the base plate 4a. In another way, further, the power supply circuit 30 may also be formed by mounting the lead frame 24 itself on the base plate 4a, cutting out the unnecessary parts of the lead frame 24, that is, the connecting pieces 25, 26, 27, 28 and 29, and then soldering the resistors 13, the diode 15 and the power supply terminals 16, 17.

As described above, according to the present embodiment, since a predetermined number (four in the embodiment) of the LEDs constitute a single LED group 8 and the plus and minus line connectors 10, 11 for supplying power to each of the LEDs 6 are formed by the web-like conductive material, no printed circuit board is required in contrast to the conventional automotive signal lamp. Further, since these line connectors 10, 11 are formed integrally with each other during manufacturing, the assembling process can be simplified.

Figure 10:
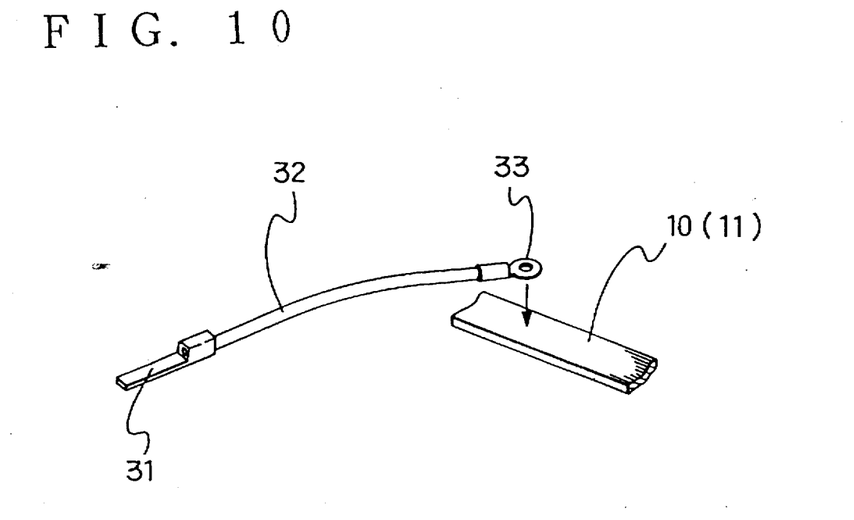
FIG. 10 is a perspective view showing an arrangement of the power supply circuit.

The power supply terminals 16, 17 may be formed integrally with the lead frame 24. On the other hand, as shown in FIG. 10, without connecting the power supply terminals 16, 17 to the plus line connector 10 and minus side power supply terminal connecting piece 14, there may be used a couple of connecting codes 32 each having one end connecting to a terminal 31 and the other end 33 being soldered to the respective plus line connector 10 and minus side power supply terminal connecting piece 14.

Figure 11:
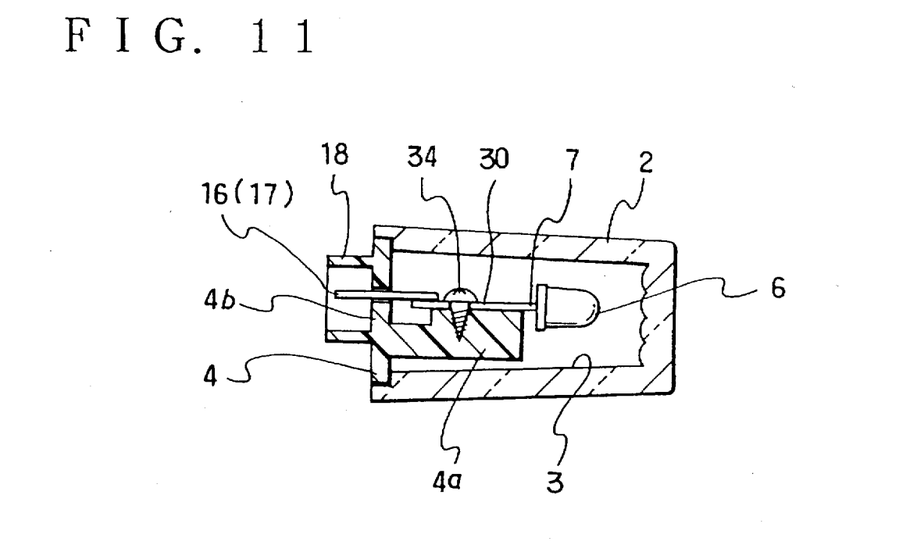
FIG. 11 is a longitudinal sectional view showing an arrangement in which the power supply circuit is secured to a lamp body by screws.

Further, the joint pieces 9, the plus line connector 10, the minus line connector 11 and the minus side power supply terminal connecting piece 14 are caulked to the base plate 4a in the foregoing embodiment. However, the invention is not limited thereto or thereby. For example, as shown in FIG. 11, these members may be secured to the base plate 4a by screws 34.

Figure 12:
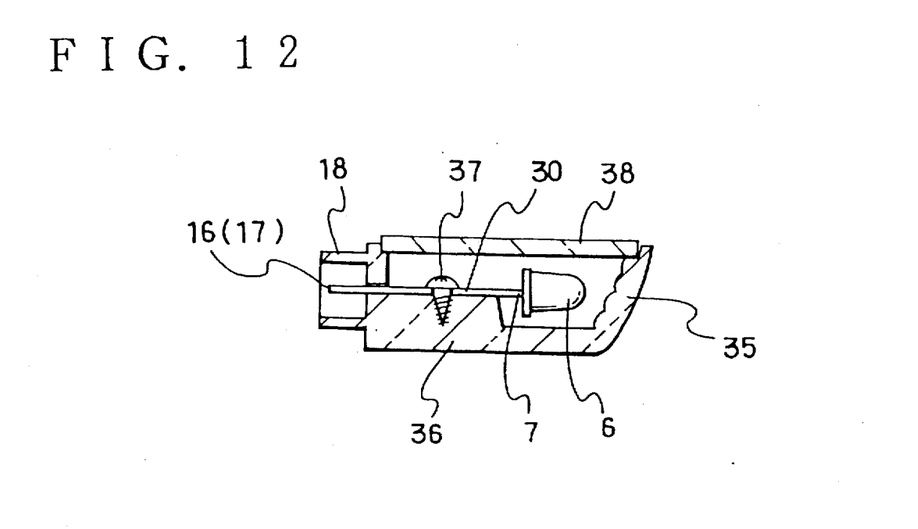
FIG. 12 is a longitudinal sectional view showing an arrangement of a lens body.

Moreover, though the lens body 2 opens rearward and the lamp body 4 closes the opening of the lens body 2 according to the present embodiment described above, the invention is not limited thereto or thereby. For example, as shown in FIG. 12, a lens body 35 opening upward may be provided with a thick seat portion 36 at a rear-lower portion thereof, the LEDs 6 and the power supply circuit 30 may be secured to the thick seat portion 36, and the upward opening of the lens body 35 may be covered with a cover plate 38.

As described above, the automotive signal lamp according to the present invention includes: a plurality of light emitting diodes arranged along an edge of a base plate disposed within a lamp chamber; a plus line connector formed of a web-like conductive material and extending in an alignment direction of the light emitting diodes; and a minus line connector formed of a web-like conductive material and extending substantially in parallel with the plus line connector, characterized in that a predetermined number of the light emitting diodes constitute one light emitting diode group, one lead connector of each of the light emitting diodes is integrally formed with one lead connector of the adjacent light emitting diode through a joint piece, an outer lead connector of one utmost light emitting diode of the light emitting diode groups connects to the plus line connector through the short-circuit piece, and an outer lead connector of the other utmost light emitting diode of the light emitting diode group connects to a minus line connector through a resistor which is provided to bridge over the plus line connector.

According to the automotive signal lamp of the present invention, a plurality of LEDs, which are supplied in a condition where lead connectors are continuously arranged by a lead frame, are not required to be taken into pieces, instead, a power supply circuit for the LEDs can be constituted merely by cutting out predetermined portions of the lead frame and connecting to predetermined portions through resistors or the like. Therefore, no printed circuit board is required, the number of required component parts can be reduced, the LEDs are not necessary to be soldered to printed circuit board, so that the required assembly steps can be decreased and the workability during assembly can be improved. As a result, the manufacturing cost can be reduced.

What is claimed is:

1. An automotive signal lamp, comprising:
    a lamp body having a base plate;
    a plurality of light source group arranging in series each consisting of a plurality of light source elements, said light source elements being arranged on a front end part of said base plate of said lamp body along a front edge thereof;
    a plus line connector formed of a conductive material, said plus line connector being secured to and arranged in substantially parallel with said base plate of said lamp body;
    a minus line connector formed of a conductive material, said minus line connector being secured to said base plate of said lamp body and arranged in substantially parallel with said plus line;
    a plurality of a first and second lead connectors projecting from each of said light source elements, said first lead connector of each of said light source elements within each light source group connecting to said second lead connector of the adjacent light source element within the same light source group, said first lead connector of the first end light source element of each of said light source group connecting to said plus line connector, and said second lead connector of the second end light source element of each of said light source group connecting to said minus line connector; and
    a lamp connector comprising a plus side power supply terminal electrically engaging with said plus line connector, a minus side power supply terminal electrically engaging with said minus line connector, and an enclosure wall surrounding said plus and minus side power supply terminal.

2. The automotive signal lamp according to claim 1, wherein said light source element comprises a light emitting diode.

3. The automotive signal lamp according to claim 1, wherein said power supply terminal comprises a couple of engagement pieces projecting therefrom, which sandwich said line connector in a first direction, and said line connector comprises two pairs of short tongue pieces, each pair sandwich said power supply terminal in a second direction perpendicular to said first direction.

4. The automotive signal lamp according to claim 3, wherein said line connector further comprises a positioning hole and said power supply terminal further comprises a projection fitting in said positioning hole of said line connector.

5. The automotive signal lamp according to claim 1, wherein said plus and minus side power supply terminals are integrally formed with said plus and minus line connectors, respectively.

6. The automotive signal lamp according to claim 1, wherein said line connectors are secured to said base plate by fitting and caulking bosses formed on said base plate in holes formed in said line connectors.

7. The automotive signal lamp according to claim 1, wherein said line connectors are secured to said base plate by screws.

8. The automotive signal lamp according to claim 1, wherein said power supply terminal comprises a connecting code having one end connecting to a terminal and the other end being soldered to said line connector.

9. The automotive signal lamp according to claim 1, further comprising a lens body coupled to said lamp body.

10. The automotive lamp according to claim 1, wherein the automotive signal lamp is a high-mount stop lamp.

11. A process for producing an automotive signal lamp comprising steps of:
    preparing a lamp body having a base plate;
    preparing a lead frame formed of a conductive material in one unit, said lead frame comprising a plurality of light source elements, a plus line connector, a minus line connector, a plurality of a first and second lead connectors projecting from each of said light source elements, connecting pieces connecting said plus line connector, said minus line connector, said first lead connector and said second lead connector to one another;

connecting resistors and diodes to predetermined positions of said lead frame;

cutting out said connecting pieces; and mounting said lead frame on said base plate of said lamp body and securing thereto.

12. The process according to claim 11, wherein said light source element comprises a light emitting diode.

13. The process according to claim 11, wherein said lead frame is formed integrally with a plus power supply terminal connecting to said plus line connector and a minus power supply terminal connecting to said minus line connector.

14. The process according to claim 11, further comprising a step of connecting a plus power supply terminal separately prepared from said lead frame to said plus line connector and connecting a minus power supply terminal separately prepared from said lead frame to said minus line connector.

15. A process for producing an automotive signal lamp comprising steps of:

preparing a lamp body having a base plate;

preparing a lead frame formed of a conductive material in one unit, said lead frame comprising a plurality of light source elements, a plus line connector, a minus line connector, a plurality of a first and second lead connectors projecting from each of said light source elements, connecting pieces connecting said plus line connector, said minus line connector, said first lead connector and said second lead connector to one another;

cutting out said connecting pieces;

connecting resistors and diodes to predetermined positions of said lead frame; and mounting said lead frame on said base plate of said lamp body and securing thereto.

16. The process according to claim 15, wherein said light source element comprises a light emitting diode.

17. The process according to claim 15, wherein said lead frame is formed integrally with a plus power supply terminal connecting to said plus line connector and a minus power supply terminal connecting to said minus line connector.

18. The process according to claim 15, further comprising a step of connecting a plus power supply terminal separately prepared from said lead frame to said plus line connector and connecting a minus power supply terminal separately prepared from said lead frame to said minus line connector.

19. A process for producing an automotive signal lamp comprising steps of:

preparing a lamp body having a base plate;

preparing a lead frame formed of a conductive material in one unit, said lead frame comprising a plurality of light source elements, a plus line connector, a minus line connector, a plurality of a first and second lead connectors projecting from each of said light source elements, connecting pieces connecting said plus line connector, said minus line connector, said first lead connector and said second lead connector to one another;

mounting said lead frame on said base plate of said lamp body and securing thereto;

cutting out said connecting pieces; and connecting resistors and diodes to predetermined positions of said lead frame.

20. The process according to claim 19, wherein said light source element comprises a light emitting diode.

21. The process according to claim 19, wherein said lead frame is formed integrally with a plus power supply terminal connecting to said plus line connector and a minus power supply terminal connecting to said minus line connector.

22. The process according to claim 19, further comprising a step of connecting a plus power supply terminal separately prepared from said lead frame to said plus line connector and connecting a minus power supply terminal separately prepared from said lead frame to said minus line connector.

* * * * *